United States Patent
Mannopantar et al.

(10) Patent No.: US 9,977,656 B1
(45) Date of Patent: May 22, 2018

(54) SYSTEMS AND METHODS FOR PROVIDING SOFTWARE COMPONENTS FOR DEVELOPING SOFTWARE APPLICATIONS

(71) Applicant: Wipro Limited, Bangalore (IN)

(72) Inventors: Raghottam Mannopantar, Bangalore (IN); Raghavendra Hosabettu, Bangalore (IN); Anoop Unnikrishnan, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days. days.

(21) Appl. No.: 15/464,024

(22) Filed: Mar. 20, 2017

(30) Foreign Application Priority Data

Mar. 13, 2017 (IN) .............................. 201741008651

(51) Int. Cl.
*G06F 9/44* (2018.01)
(52) U.S. Cl.
CPC .................. *G06F 8/20* (2013.01); *G06F 8/10* (2013.01); *G06F 8/35* (2013.01)
(58) Field of Classification Search
CPC ........................................................ G06F 8/20
See application file for complete search history.

(56) References Cited

U.S. PATENT DOCUMENTS

| | | | |
|---|---|---|---|
| 5,899,045 A | 5/1999 | Giannarelli | |
| 8,175,936 B2 | 5/2012 | Ronen et al. | |
| 8,230,392 B2* | 7/2012 | Joss | G06F 8/36 717/120 |
| 8,584,086 B2* | 11/2013 | Yoshimura | G06F 8/36 717/104 |
| 8,595,700 B2* | 11/2013 | Huang | G06F 9/547 717/120 |
| 8,607,190 B2 | 12/2013 | Coldicott et al. | |
| 8,676,853 B2* | 3/2014 | Kasravi | G06F 8/36 707/792 |
| 8,719,508 B2 | 5/2014 | Comparan et al. | |
| 8,762,360 B2 | 6/2014 | Jiang et al. | |
| 8,935,191 B2 | 1/2015 | Allgaier | |

(Continued)

*Primary Examiner* — Philip Wang
(74) *Attorney, Agent, or Firm* — Finnegan, Henderson, Farabow, Garrett & Dunner LLP

(57) ABSTRACT

This disclosure relates to methods and systems for providing software components for developing software applications. In one embodiment, a method for providing software components for developing software applications is provided. The method comprises receiving user input requirements associated with the software application; determining a requirements matching score for every software component existing in an application development environment, based on a comparison between the received requirements and a requirements model, wherein the requirements model is generated based on historic user requirements and usage; determining a performance score based on a response time associated with the software components; determining weights corresponding to the requirements matching score and the performance score based on the requirements matching score; determining a combined score based on the determined scores and associated weights; selecting software components for developing the software application based on the determined combined scores; and providing the selected software components to the user.

20 Claims, 6 Drawing Sheets

500

| Requirement # | Selected API Ref | Req. Mat Score | Function + Tech Score | Performance Score | Success Score | Combined Score |
|---|---|---|---|---|---|---|
| Req-1 | A1 | 0 | 6 | 4 | 0 | 5 |
| | A2 | 2 | 8 | 6.5 | 7 | 5.65 |
| Req-2 | B1 | 8 | 7 | 6 | 7 | 7.6 |
| | B2 | 7 | 6.5 | 5 | 6 | 6.7 |
| Req-3 | C1 | 8 | 7.5 | 5 | 0 | 7.6 |
| | C2 | 6 | 6 | 4 | 0 | 4.8 |
| Req-4 | D1 | 5 | 8 | 0 | 0 | 3.9 |
| | D2 | 6 | 4 | 0 | 0 | 3 |

510  520  530  540  550  560  570

(56) References Cited

U.S. PATENT DOCUMENTS

| | | | |
|---|---|---|---|
| 9,009,664 B2* | 4/2015 | Muddu | G06F 8/36 717/121 |
| 9,038,017 B2 | 5/2015 | Premkumar et al. | |
| 9,165,043 B2 | 10/2015 | Jin et al. | |
| 9,235,386 B2 | 1/2016 | Carlson et al. | |
| 9,330,095 B2* | 5/2016 | Fedorenko | G06F 17/30017 |
| 9,519,464 B2* | 12/2016 | Dang | G06F 8/36 |
| 9,870,207 B2* | 1/2018 | Mathias | G06F 3/0484 |
| 2003/0005412 A1 | 1/2003 | Eanes | |

* cited by examiner

| API Names | Max time taken Tmax | Data in MB Smax | Response time (R1)=Tmax/Smax | Min time taken Tmin | Data in MB Smin | Response time (R2)=Tmin/Smin | Average (R)=(R1+R2)/2 | Normalize R/Total of R |
|---|---|---|---|---|---|---|---|---|
| A | 50 | 5 | 10 | 5 | 0.5 | 10 | 10 | .14 |
| B | 75 | 3 | 25 | 8 | 0.7 | 11.42857 | 18 | .25 |
| C | 60 | 2 | 30 | 9 | 0.2 | 45 | 38 | .52 |
| D | 45 | 4 | 11.25 | 2 | 1 | 2 | 7 | .10 |
|   |   |   |   |   |   | Total of R | 73 |   |

| Requirement # | Selected API Ref | Req. Mat Score | Function + Tech Score | Performance Score | Success Score | Combined Score |
|---|---|---|---|---|---|---|
| Req-1 | A1 | 0 | 6 | 4 | 0 | 5 |
| | A2 | 2 | 8 | 6.5 | 7 | 5.65 |
| Req-2 | B1 | 8 | 7 | 6 | 7 | 7.6 |
| | B2 | 7 | 6.5 | 5 | 6 | 6.7 |
| Req-3 | C1 | 8 | 7.5 | 5 | 0 | 7.6 |
| | C2 | 6 | 6 | 4 | 0 | 4.8 |
| Req-4 | D1 | 5 | 8 | 0 | 0 | 3.9 |
| | D2 | 6 | 4 | 0 | 0 | 3 |

510 520 530 540 550 560 570

FIG. 5

SYSTEMS AND METHODS FOR PROVIDING SOFTWARE COMPONENTS FOR DEVELOPING SOFTWARE APPLICATIONS

TECHNICAL FIELD

This disclosure relates generally to development of software applications, and more particularly, to methods and systems for providing software components for developing software applications.

BACKGROUND

In a software development organization, various software developers develop source codes and software components for implementing various types of functionalities and software applications. Reusing the developed software components can enable faster implementation of new software applications and would be a step forward towards rapid application development (RAD).

There are several challenges in achieving RAD using existing systems due to various technical problems in reusing the developed software components. In some existing systems, there is no search functionality of developed software components based on business logic. In some existing systems, there is no search functionality of developed software components based on technical requirements of the new application. Further, in some existing systems, there is no learning mechanism which can recommend software components for application development with minimal developer assistance.

SUMMARY

Embodiments of the present disclosure present technological improvements as solutions to one or more of the above-mentioned technical problems in conventional software application development.

Embodiments of the present disclosure provide systems and methods for providing software components for developing software applications. In one embodiment, a system for providing one or more software components for developing a software application is provided. The system comprises one or more hardware processors and one or more memory units storing instructions executable by the one or more hardware processors for receiving a user input via a user interface, the input including one or more requirements associated with the software application; determining, for each of a plurality of software components existing in an application development environment, a requirements matching score based on a comparison between the received requirements and a requirements model associated with the corresponding software component, wherein the requirements model is generated based on historic user requirements and historic usage of the software component; determining, a performance score for each of the plurality of software components based on a response time associated with the corresponding software component; determining, weights corresponding to the requirements matching score and performance score based on the requirements matching score; determining, a combined score for each of the plurality of software components based on the determined score values and associated weights; selecting, from the plurality of software components, the one or more software components for developing the software application based on the combined score for each of the plurality of software components; and providing, the one or more software components to the user via the user interface.

In another embodiment, a method for providing one or more software components for developing a software application is provided. The method comprises: receiving, by a processor, a user input via a user interface, the input including one or more requirements associated with the software application; determining, by the processor, for each of a plurality of software components existing in an application development environment, a requirements matching score based on a comparison between the received requirements and a requirements model associated with the corresponding software component, wherein the requirements model is generated based on historic user requirements and historic usage of the software component; determining, by the processor, a performance score for each of the plurality of software components based on a response time associated with the corresponding software component; determining, by the processor, weights corresponding to the requirements matching score and performance score based on the requirements matching score; determining, by the processor, a combined score for each of the plurality of software components based on the determined score values and associated weights; selecting, by the processor, from the plurality of software components, the one or more software components for developing the software application based on the combined score for each of the plurality of software components; and providing, by the processor, the one or more software components to the user via the user interface.

In yet another embodiment, a non-transitory computer readable storage medium is provided. The storage medium stores a program that, when executed by a computer, cause the computer to perform a method of receiving a user input via a user interface, the input including one or more requirements associated with the software application; determining, for each of a plurality of software components existing in an application development environment, a requirements matching score based on a comparison between the received requirements and a requirements model associated with the corresponding software component, wherein the requirements model is generated based on historic user requirements and historic usage of the software component; determining, a performance score for each of the plurality of software components based on a response time associated with the corresponding software component; determining, weights corresponding to the requirements matching score and performance score based on the requirements matching score; determining, a combined score for each of the plurality of software components based on the determined score values and associated weights; selecting, from the plurality of software components, the one or more software components for developing the software application based on the combined score for each of the plurality of software components; and providing, the one or more software components to the user via the user interface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3 is a table of an exemplary set of response time data and associated response time calculations, according to some embodiments of the present disclosure.

FIG. 5 is a table of exemplary component scores and combined scores calculated for API/components selected in response to a user input request, according to some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments described herein provide systems and methods for providing software components for developing software applications. As described above, there are several technical problems in conventional system and methods for providing software components for developing software applications. The disclosed systems and methods include a development environment where many software components may be developed and deployed as application program interfaces (APIs) or services or libraries. Such software components developed for an organization can have a common structure which may include, for example, the component type name, algorithms supported, database layer supported, ontologies etc.

Metadata can be created for every software component as soon as it is registered in the repository. The metadata may include various functional and technical details. Based on the user requirement (functional and/or technical), an API/software component can be selected based on a component selection model. The disclosed system can suggest one or more options with an associated score to the user. The user may then choose from one or more of the suggested options. Based on the user selection, rewards may be added to the selected software components and the component selection model can be updated with details of the learning. The received rewards can be used in calculation of matching scores for future suggestions to the user.

Disclosed methods and systems can learn from developer actions (such as selection of API, creation of API work flow, requirement and solution mapping). Further, disclosed methods and systems can suggest and recommend solution blocks using the underlying previously captured requirement to solution mapping. In some embodiments, disclosed methods and systems may analyze the underlying logs of previously created solutions and recommend a combination of blocks that has the best performance. In some embodiments, disclosed methods and systems can track the performance of APIs such as time utilized, amount of data handled, failure frequency, usage numbers, and calculate the success rate of each API. Further, disclosed methods and systems can understand the inputted user requirements and create solutions and data models.

Figure 1:
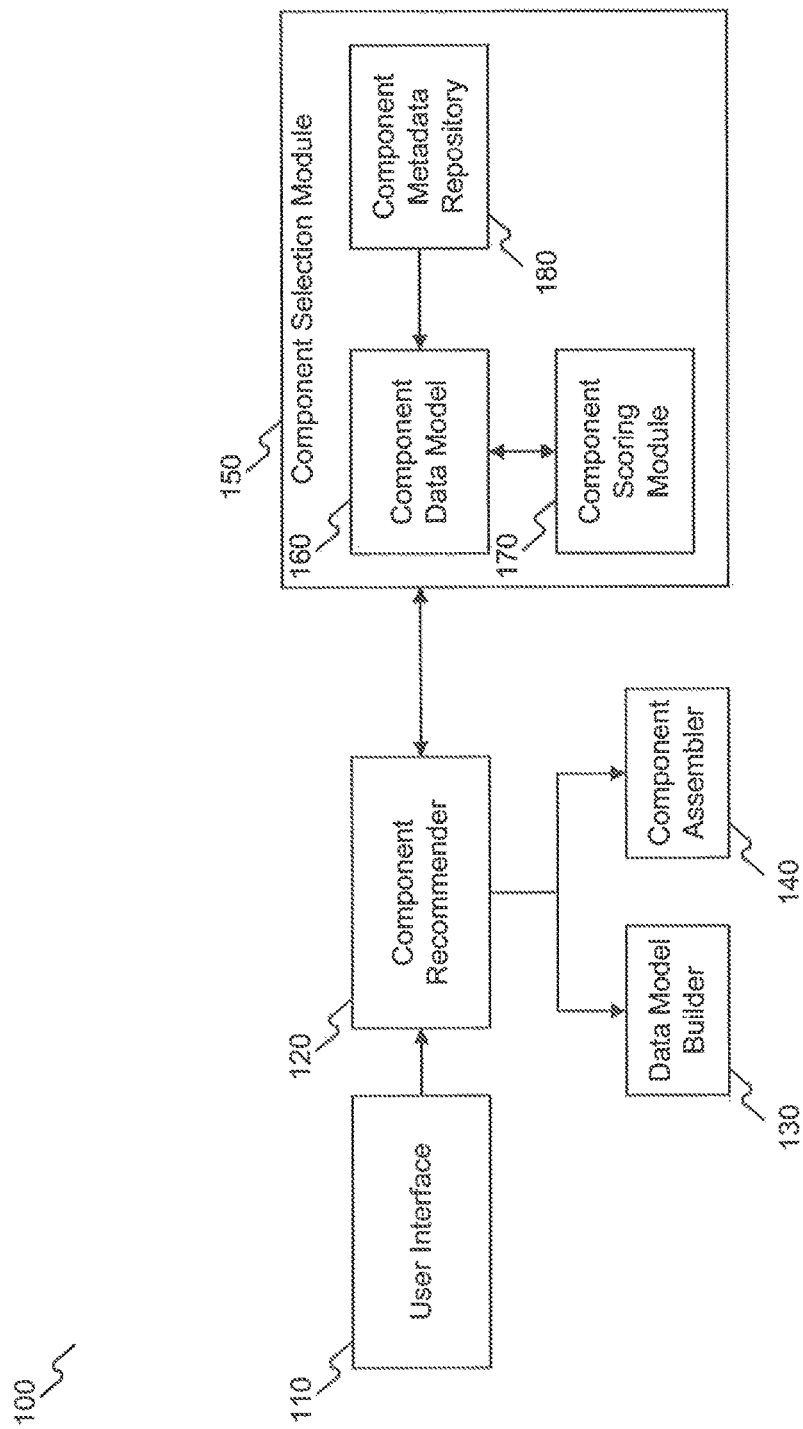
FIG. 1 is a block diagram illustrating an exemplary system for providing software components for developing software, according to embodiments of the present disclosure.

FIG. 1 illustrates an exemplary system 100 for providing software components for developing software applications using disclosed systems and methods. Exemplary system 100 can comprise user interface 110, component recommender 120, data model builder 130, component assembler 140, component selection module 150. Component selection module 150 may further comprise component data model 160, component scoring module 170 and component metadata repository 180.

For the purposes of this disclosure, "modules" may be implemented in software, hardware, firmware, a mix of any of those, or the like. For example, if the disclosed "modules" are implemented in software, they may be stored in a memory associated with system 100. Processors, I/O devices, and memory devices may be used to perform processes to implement and facilitate operations of the modules. Thus, the modules may include code instructions executable by one or more processors, alone or in various combinations with other modules disclosed in this or other embodiments. If the disclosed "modules" are implemented in hardware, they may comprise an embedded system or other dedicated hardware configured by machine code, assembly code, or the like to interact with other modules to perform functions consistent with disclosed embodiments.

Component metadata repository 180 can include the details of the components or APIs registered to system 100. In some embodiments, component metadata repository 180 can include the functional and technical details of the registered APIs regarding their usage.

Component data model 160 can be a data model built on the basis of past usage of components, of system 100 based on user requirements. Component data model 160 can be updated each time more usage data becomes available.

Component scoring module 170 can calculate a score for the component or API selected for a requested requirement. Components with a score above certain threshold values can be displayed to the user. In some embodiments, a breakup of the score components may also be displayed to the user.

Component recommender 120 may perform two functions. One function may be to receive a user input and communicate the received input to component selection module 150. A second function may be to display component recommendations to the user based on the component score received from component selection module 150. In some embodiments, component recommender 120 may also display a breakup of the score components. A user can either accept the component suggestion provided by component recommender 120 or choose a different component via the user interface 110.

Component assembler 140 can assemble the software components based on the user selection. In some embodiments, component assembler 140 can also update component data model 160 according to the user selection.

Data model builder 130 can create a data model based on the user input data set, type of data model required, and the parameters of the data model. The types of data model can include, for example, clustering, classification, regression and dimensionality reduction. In some embodiments, data model builder 130 can create a data model based on parameters that may include, for example, optimization, LF, regularization, and activation function.

Figure 2:
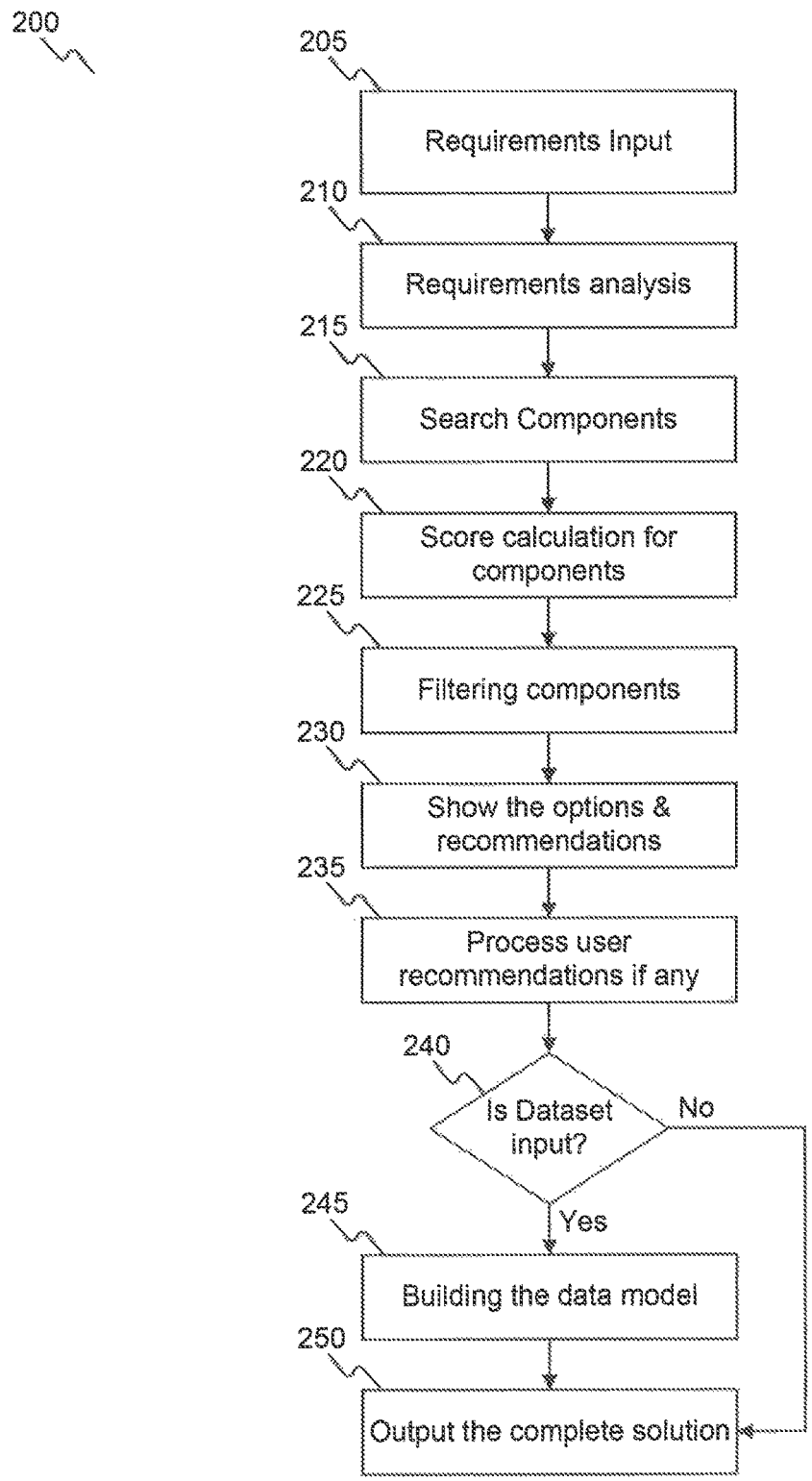
FIG. 2 is a flow diagram illustrating an exemplary method for providing software components for developing software applications, according to some embodiments of the present disclosure.

FIG. 2 illustrates an exemplary method 200 for providing software components for developing software applications. Referring to FIG. 2, it will be readily appreciated by one of ordinary skill in the art that the illustrated procedure can be altered to modify the order of steps, delete steps or further include additional steps. In some embodiments, method 200 can be performed, for example, by system 100 of FIG. 1.

After an initial start, user interface 110 can receive from a user, requirements associated with development of a software application in step 205. The received user requirements may be in text format and can include functional and/or technical requirements. In some embodiments, the technical requirements may include preferred operating systems, algorithms, multithreads, etc. In some embodiments, the received user requirements may also include the dataset on which the solution has to be provided. As an example, a user may upload a dataset, specify the type of modeling required (examples can be clustering, classification, regression and dimensionality reduction) and specify the parameters of the modeling (examples can be optimization, LF, regularization, and activation function).

In step 210, component recommender 120 can analyze the received user requirements. Component recommender 120 can determine if the received user requirements include all mandatory requirements. If any mandatory requirements are determined to be missing, component recommender 120 can request the user to input the missing requirements through user interface 110. If all mandatory requirements are determined to be present, component recommender 120 can send the received requirements to component selection module 150.

In step 215, component selection module 150 can search components in component metadata repository 180 based on the user requirements received from component recommender 120. Component selection module 150 can calculate a score for the components based on the received user requirements.

In step 220, component scoring module 170 of component selection module 150 can calculate a combined score for the searched components from step 215. If the calculated combined score is above a threshold value, component selection module 150 can provide that component to component recommender 120 for display to the user.

In some embodiments, the combined score may comprise requirements matching score, functional and technical requirements matching score, performance score, and success rate score. The individual score components may each have different weightage and combined score can be calculated based on the value and weightage of the individual scores. In some embodiments, the weightage of the individual scores can be based on rules set for the requirements matching score. The requirements matching score can be computed first and the weightage of the individual scores (including the requirements matching score) can be decided based on the computed value of the requirements matching score. The requirements matching score can be computed by analyzing and comparing the received user requirements with an associated requirements model built based on ontology, natural language processing (NLP) techniques, historic user requirements and usage data. As an example, if the requirements matching score is computed to be zero, that can suggest that there are no matching input requirements in historical data and zero weightage can be assigned to the requirements matching score. For another example, where the computed requirements matching score is a high value, indicating high similarity with one or more historical user requirements, a higher weightage can be assigned to the requirements matching score. In some embodiments, rules can be configured to have different weightage for the individual scores according to user input.

In some embodiments, if the requirements matching score is computed to be zero, then weightage of the functional and technical requirements matching score can be set at 0.7, weightage of the performance score can be set at 0.2 and weightage of the success rate score can be set at 0.1. If the requirements matching score is computed to be between one and six, then weightage of the requirements matching score can be set at 0.3, weightage of the functional and technical requirements matching score can be set at 0.3, weightage of the performance score can be set at 0.3 and weightage of the success rate score can be set at 0.1. Further, if the requirements matching score is computed to be between six and eight, then weightage of the requirements matching score can be set at 0.7, weightage of the functional and technical requirements matching score can be set at 0.2, weightage of the performance score can be set at 0.1 and weightage of the success rate score can be set at zero. If the requirements matching score is computed to be between eight and ten, then weightage of the requirements matching score can be set at 0.8, weightage of the functional and technical requirements matching score can be set at 0.1, weightage of the performance score can be set at 0.05 and weightage of the success rate score can be set at 0.05.

In some embodiments, the component scoring module 170 can calculate the functional and technical requirements matching score using ontology based search for input text in received functional and technical requirement details and searching for matching text in component metadata repository 180. Component scoring module 170 can average the results of functional and technical matching in order to compute the functional and technical requirements matching score.

In some embodiments, the component scoring module 170 can calculate the performance score by only considering response time and assuming other performance parameters like processor speed, available memory, hard disk and bandwidth are the same. The response time may be determined as the time from when a user enters a request until the first character of the response is received. In calculating the response time, two sets of data can be considered. One set of data can be the maximum time taken for unit size of data. FIG. 3 is a table of exemplary set of response time data and associated response time calculations, in accordance with some embodiments of the present disclosure. Column 310 may list names of exemplary APIs or components. Column 320 may list maximum time taken for a response and column 330 may list size of associated data for each API or component in column 310. Column 340 lists the calculated maximum response time for unit size of data. A second set of data for response time calculations can be the minimum time taken for unit size of data. Referring back to FIG. 3, column 350 may list minimum time taken for a response and column 360 may list size of associated data for each API or component in column 310. Column 370 lists the calculated minimum response time for unit size of data. The performance score can be calculated by averaging and normalizing the two sets of data. For example, column 380 of FIG. 3 may be calculated by averaging the maximum response time for unit size of data 340 and minimum response time for unit size of data 370. Column 390 may be calculated by normalizing average response time value 380 for each API/component by the sum of all average response time values 395.

Figure 4:
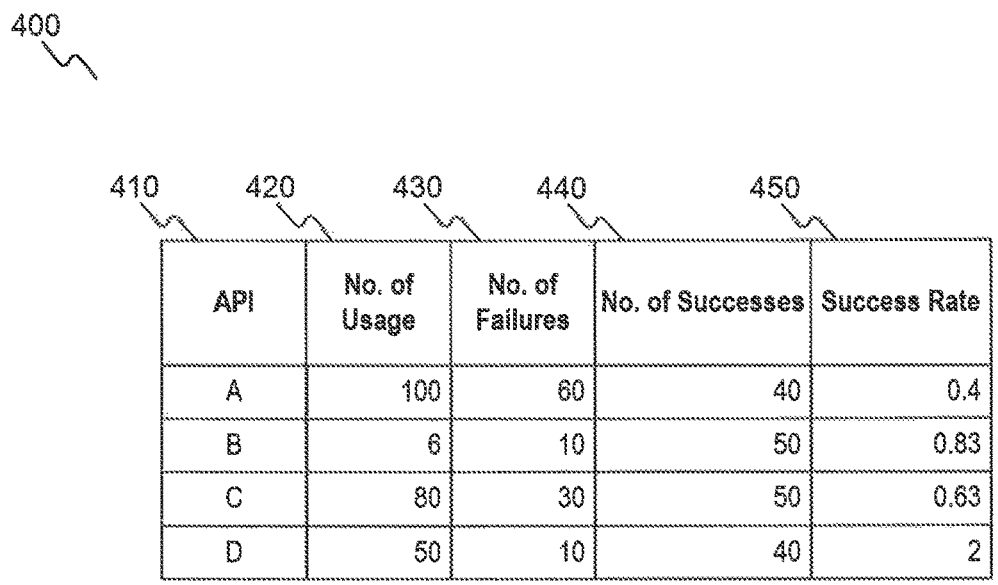
FIG. 4 is a table of exemplary set of usage and success data of various API/components and associated success rate calculations, according to some embodiments of the present disclosure.

In some embodiments, the component scoring module 170 can calculate the success rate score for an API or component based on the number of times that API or component was used or called and the number of times it was completed. FIG. 4 is a table of exemplary set of usage and success data of various APIs or components and associated success rate calculations, in accordance with some embodiments of the present disclosure. Column 410 may list names of exemplary APIs or components and column 420 may list the number of times the exemplary API or component was used. Further, column 430 may list the number of failures and column 440 may list number of successes for each API or component in column 410. Column 450 may list the success rate calculated as the ratio of number of successes 440 to the total number of usage 420.

Component scoring module 170 can calculate a combined score using the computed requirements matching score, functional and technical requirements matching score, performance score, and success rate score and their corresponding weightage. The combined score can be calculated using the following expression:

Combined score=(Requirements matching score×weightage of requirements matching score)+(functional and technical requirements matching score×weightage of functional and technical requirements matching score)+(performance score×weightage of performance score)+(success rate score×weightage of success rate score)

In an embodiment, if the API/component may be selected by a user which is not selected by the component selection module 150, then the component scoring module 170 may calculate an additional score for that API/component. The additional score may be computed based on the number of times of recommendations of the API/component by the user and the total number of times the user selected API/component is used. The additional score may be calculated using the following expression:

Additional Score=(Number of times of recommendation/number of times of usage)

The additional score may be calculated for the parameter whose combined score is more than system selected API/component. If the combined score is more in more than one parameter for the user selected API/component, the additional score is added for both parameter. For example, a user selects the D2 API/component even though system suggested the D1 API/component based on combined score. In D2 API/component, the requirements match score (6) is more than that of D1 API/component (5). So, the number of recommendation will be increased from previous recommendation value by 1. Now, assuming that Number of usage of API=13
The number of recommendation=2
Additional score=2/13=0.15
This additional score is added for API score calculation, next/subsequent time.
If calculated requirements match score is 6
Recalculated value will be=Score+(Score*Additional score)
Recalculated value=6+(6*0.15)
Recalculated value=6.9

FIG. 5 is a table of exemplary component scores and combined scores calculated for APIs or components selected in response to a user input request, in accordance with some embodiments of the present disclosure. Column 510 may list names of exemplary user input requirements and column 520 may list APIs or components selected by component selection module 150 in response to user requirements 510. Further, columns 530, 540, 550, and 560 may list the individual requirements matching score, functional and technical requirements matching score, performance score, and success rate score respectively. Column 570 may list combined score based on the individual scores and the corresponding weightage of the individual scores. As an example, for requirement Req-1 and selected API A1, requirements matching score 530 is computed to be zero and accordingly weightage of the functional and technical requirements matching score can be set at 0.7, weightage of the performance score can be set at 0.2 and weightage of the success rate score can be set at 0.1. Combined score 570 can therefore be calculated to be 5 using the expression "0+(6×0.7)+(4×0.2)+0."

Referring back to FIG. 2, after the score calculation for components in step 220, method 200 can proceed to filtering components in step 225. If the calculated combined score for an API or component in step 220 is above a predetermined threshold value, component selection module 150 can provide it to component recommender 120.

In step 230, component recommender 120 can suggest the selected component provided by component selection module 150 to the user for developing the software application. Suggested components may be based on the scores calculated by component scoring module 170 in step 220. For example, based on values listed in column 570 of table 500, suggested components can be A2 (5.65) for Req-1, B1 (7.6) for Req-2, C1 (7.6) for Req-3, and D1 (3.9) for Req-4.

In some embodiments, component recommender 120 can determine if there are any solutions already built in and using a large proportion of the suggested components (for example, larger than a threshold proportion of 50%). The threshold proportion may be configurable by the user. Any solutions meeting the criteria can be provided to the user for consideration. The number of recommendations can be restricted by overall performance and threshold number of solutions. Further, overall performance of the solutions cannot be considered if none or only a few APIs or components of the solution are utilized in a sequence, leaving some APIs or components not utilized. Overall performance of the solutions can be considered if all APIs or components are involved in a much larger sequence.

In step 235, component assembler 140 can detect and process if the user makes any changes to suggestions provided in step 230. If any changes are detected and processed, the associated data can be stored in component metadata repository 180 and component data model 160 can be updated accordingly. Further, the API or component chosen by the user can be rewarded for matching user requirements by increasing the corresponding requirements matching score. This may enable the API or component to be suggested for similar future user requirements.

In an embodiment, if the API/component may be selected by a user which is not selected by the component selection module 150, then the component scoring module 170 may calculate an additional score for that API/component. The additional score may be computed based on the number of times of recommendations of the API/component by the user and the total number of times the user selected API/component is used. The additional score may be calculated for the parameter whose combined score is more than system selected API/component. If the combined score is more in more than one parameter for the user selected API/component, the additional score is added for both parameter.

In step 240, user interface 110 can determine if user has provided a dataset along with the input requirements. If no dataset is received from the user, method 200 can proceed to step 250 and output the complete solution. Some data analysis solutions cannot be completed without data modeling which is used as machine learning. Along with APIs and components, a data model built using preferred configuration may also be required.

In step 245, a data model can be created based on the user input data set and type of data model required (for example, clustering, classification, regression and dimensionality reduction) and parameters such as optimization, LF, regularization, Activation Function). After data model is built, method 200 can proceed to step 250 and output the complete solution.

Computer System

Figure 6:
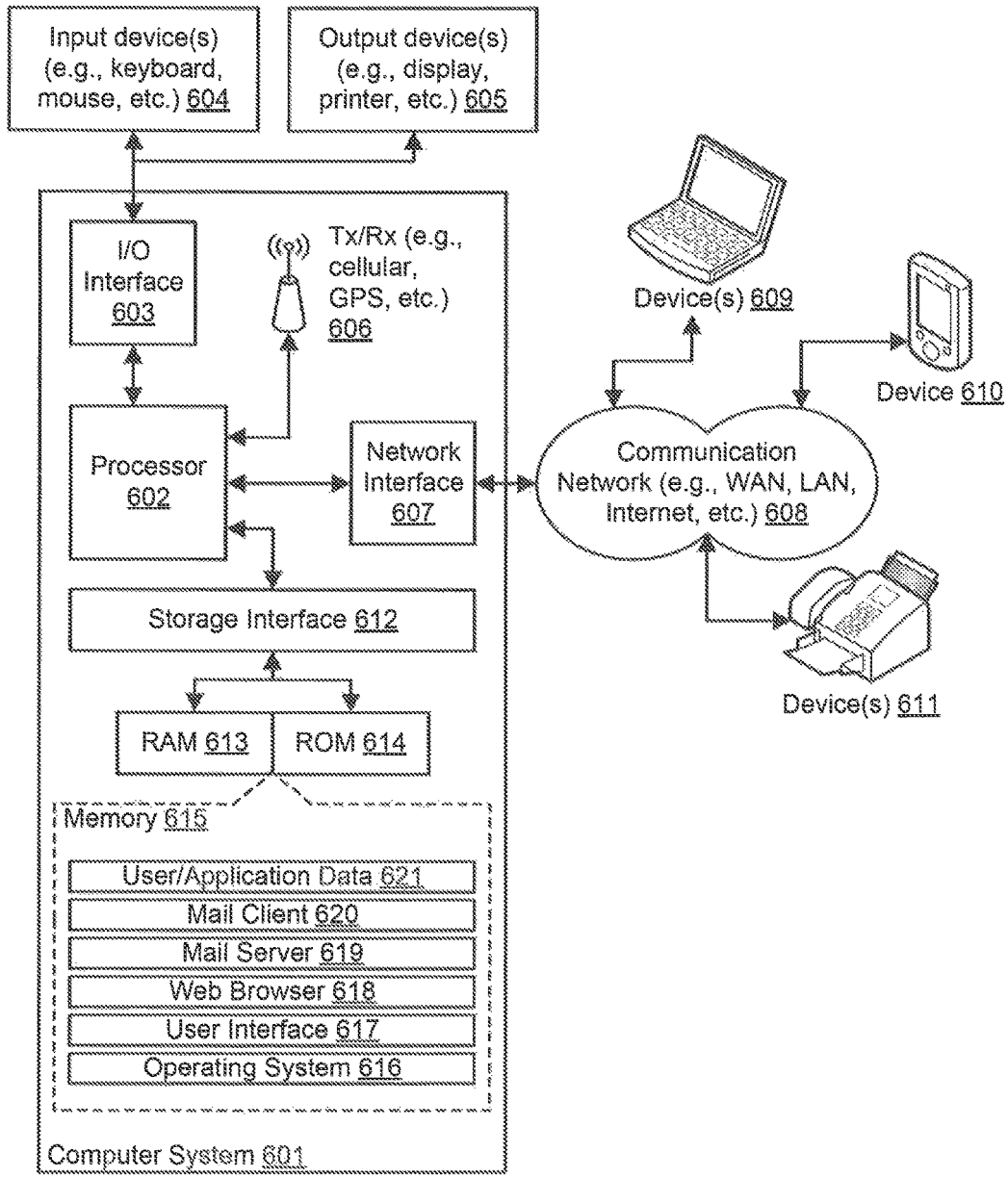
FIG. 6 is a block diagram of an exemplary computer system for implementing embodiments consistent with the present disclosure.

FIG. 6 is a block diagram of an exemplary computer system for implementing embodiments consistent with the present disclosure. Variations of computer system 601 may be used for implementing the devices and systems disclosed herein. Computer system 601 may comprise a central processing unit ("CPU" or "processor") 602. Processor 602 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 610, 611, and 612. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for providing software components for developing software applications. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed:

1. A method for providing one or more software components for developing a software application, comprising:
    receiving, by at least one processor, an input from a user via a user interface, the input including one or more requirements associated with the software application;
    determining, by the at least one processor, for each of a plurality of software components existing in an application development environment, a requirements matching score based on a comparison between the one or more requirements and a requirements model associated with the corresponding software component, wherein the requirements model is generated based on historic user requirements and historic usage of the software component;
    determining, by the at least one processor, a performance score for each of the plurality of software components based on a response time associated with the corresponding software component;
    determining, by the at least one processor, a weight corresponding to the requirements matching score and a weight corresponding to the performance score based on the requirements matching score;
    determining, by the at least one processor, a combined score for each of the plurality of software components based on the weight corresponding to the requirements matching score and the weight corresponding to the performance score;
    selecting, by the at least one processor, from the plurality of software components, the one or more software components for developing the software application based on the combined score for each of the plurality of software components; and
    providing, by the at least one processor, the one or more software components to the user via the user interface.

2. The method of claim 1, further comprising:
    determining a success rate score for each of the plurality of software components based on a rate of the corresponding software component being called and completed;

determining a weight corresponding to the success rate score based on the requirements matching score; and determining a combined score for each of the plurality of software components based on the weight corresponding to the requirements matching score, the weight corresponding to the performance score, and the weight corresponding to the success rate score.

3. The method of claim 1, further comprising:

determining a functional and technical match score for each of the plurality of software components based on the input and a metadata repository, the metadata repository including metadata for each of the plurality of software components;

determining a weight corresponding to functional and technical match score based on the requirements matching score; and determining a combined score for each of the plurality of software components based on the weight corresponding to the requirements matching score, the weight corresponding to the performance score, and the weight corresponding to the functional and technical match score.

4. The method of claim 3, wherein the input includes one or more words in natural language, and wherein determining the functional and technical match score includes searching the metadata repository for the one or more words using natural language processing.

5. The method of claim 1, further comprising:

determining whether the combined score for each of the plurality of software components is above a predetermined threshold; and if the combined score is above the predetermined threshold, selecting the corresponding software component for developing the software application.

6. The method of claim 1, further comprising:

receiving a user selection of a first software component among the one or more software components; and updating the requirements model associated with the first software component based on the user selection.

7. The method of claim 1, further comprising:

determining that a first software component is selected by the user when the first software component is not provided to the user in the user interface in a prior user request for providing software components; and increasing the requirements matching score for the first software component based on a number of occurrence that the first software component is selected by the user when the first software component is not provided to the user in the user interface in prior user requests for providing software components.

8. The method of claim 1, further comprising generating a data model based on dataset and a type of data model identified in the input.

9. A system for providing one or more software components for developing a software application, comprising:

one or more hardware processors; and a memory storing instructions that, when executed by the one or more hardware processors, cause the one or more hardware processors to perform operations including:

receiving an input from a user via a user interface, the input including one or more requirements associated with the software application;

determining, for each of a plurality of software components existing in an application development environment, a requirements matching score based on a comparison between the one or more requirements and a requirements model associated with the corresponding software component, wherein the requirements model is generated based on historic user requirements and historic usage of the software component;

determining a performance score for each of the plurality of software components based on a response time associated with the corresponding software component;

determining a weight corresponding to the requirements matching score and a weight corresponding to the performance score based on the requirements matching score;

determining a combined score for each of the plurality of software components based on the weight corresponding to the requirements matching score and the weight corresponding to the performance score;

selecting, from the plurality of software components, the one or more software components for developing the software application based on the combined score for each of the plurality of software components; and providing the one or more software components to the user via the user interface.

10. The system of claim 9, wherein the memory stores instructions that, when executed by the one or more hardware processors, cause the one or more hardware processors to further perform operations including:

determining a success rate score for each of the plurality of software components based on a rate of the corresponding software component being called and completed;

determining a weight corresponding to the success rate score based on the requirements matching score; and determining a combined score for each of the plurality of software components based on the weight corresponding to the requirements matching score, the weight corresponding to the performance score, and the weight corresponding to the success rate score.

11. The system of claim 9, wherein the memory stores instructions that, when executed by the one or more hardware processors, cause the one or more hardware processors to further perform operations including:

determining a functional and technical match score for each of the plurality of software components based on the input and a metadata repository, the metadata repository including metadata for each of the plurality of software components;

determining a weight corresponding to functional and technical match score based on the requirements matching score; and determining a combined score for each of the plurality of software components based on the weight corresponding to the requirements matching score, the weight corresponding to the performance score, and the weight corresponding to the functional and technical match score.

12. The system of claim 11, wherein the input includes one or more words in natural language, and wherein the memory stores instructions that, when executed by the one or more hardware processors, cause the one or more hardware processors to further perform operations including:

determining the functional and technical match score includes searching the metadata repository for the one or more words using natural language processing.

13. The system of claim 9, wherein the memory stores instructions that, when executed by the one or more hardware processors, cause the one or more hardware processors to further perform operations including:
  determining whether the combined score for each of the plurality of software components is above a predetermined threshold; and
  if the combined score is above the predetermined threshold, selecting the corresponding software component for developing the software application.

14. The system of claim 9, wherein the memory stores instructions that, when executed by the one or more hardware processors, cause the one or more hardware processors to further perform operations including:
  receiving a user selection of a first software component among the one or more software components; and
  updating the requirements model associated with the first software component based on the user selection.

15. The system of claim 9, wherein the memory stores instructions that, when executed by the one or more hardware processors, cause the one or more hardware processors to further perform operations including:
  determining that a first software component is selected by the user when the first software component is not provided to the user in the user interface in a prior user request for providing software components; and
  increasing the requirements matching score for the first software component based on a number of occurrence that the first software component is selected by the user when the first software component is not provided to the user in the user interface in prior user requests for providing software components.

16. The system of claim 9, wherein the memory stores instructions that, when executed by the one or more hardware processors, cause the one or more hardware processors to further perform operations including:
  generating a data model based on dataset and a type of data model identified in the input.

17. A non-transitory computer-readable medium storing instructions for providing one or more software components for developing a software application that, when executed by a processor, cause the processor to perform operations including:
  receiving an input from a user via a user interface, the input including one or more requirements associated with the software application;
  determining, for each of a plurality of software components existing in an application development environment, a requirements matching score based on a comparison between the one or more requirements and a requirements model associated with the corresponding software component, wherein the requirements model is generated based on historic user requirements and historic usage of the software component;
  determining a performance score for each of the plurality of software components based on a response time associated with the corresponding software component;
  determining a weight corresponding to the requirements matching score and a weight corresponding to the performance score based on the requirements matching score;
  determining a combined score for each of the plurality of software components based on the weight corresponding to the requirements matching score and the weight corresponding to the performance score;
  selecting, from the plurality of software components, the one or more software components for developing the software application based on the combined score for each of the plurality of software components; and
  providing the one or more software components to the user via the user interface.

18. The non-transitory computer-readable medium of claim 17, wherein the non-transitory computer-readable medium stores instructions that, when executed by the processor, cause the processor to further perform operations including:
  determining a success rate score for each of the plurality of software components based on a rate of the corresponding software component being called and completed;
  determining a weight corresponding to the success rate score based on the requirements matching score; and
  determining a combined score for each of the plurality of software components based on the weight corresponding to the requirements matching score, the weight corresponding to the performance score, and the weight corresponding to the success rate score.

19. The non-transitory computer-readable medium of claim 17, wherein the non-transitory computer-readable medium stores instructions that, when executed by the processor, cause the processor to further perform operations including:
  determining a functional and technical match score for each of the plurality of software components based on the input and a metadata repository, the metadata repository including metadata for each of the plurality of software components;
  determining a weight corresponding to functional and technical match score based on the requirements matching score; and
  determining a combined score for each of the plurality of software components based on the weight corresponding to the requirements matching score, the weight corresponding to the performance score, and the weight corresponding to the functional and technical match score.

20. The non-transitory computer-readable medium of claim 19, wherein the input includes one or more words in natural language, and the non-transitory computer-readable medium stores instructions that, when executed by the processor, cause the processor to further perform operations including:
  determining the functional and technical match score includes searching the metadata repository for the one or more words using natural language processing.

* * * * *